(12) United States Patent
Kim et al.

(10) Patent No.: US 11,997,401 B2
(45) Date of Patent: May 28, 2024

(54) IMAGE SENSOR, IMAGE ACQUISITION APPARATUS, AND ELECTRONIC APPARATUS WITH IMPROVED PERFORMANCE

(71) Applicant: SAMSUNG ELECTRONICS CO., LTD., Suwon-si (KR)

(72) Inventors: Jungwoo Kim, Hwaseong-si (KR); Byeongil Min, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/832,029

(22) Filed: Jun. 3, 2022

(65) Prior Publication Data

US 2023/0134771 A1     May 4, 2023

(30) Foreign Application Priority Data

Oct. 28, 2021 (KR) ................ 10-2021-0146059

(51) Int. Cl.
*H04N 25/40*  (2023.01)
*H04N 25/58*  (2023.01)
*H04N 25/704* (2023.01)
*H04N 25/75*  (2023.01)

(52) U.S. Cl.
CPC ........... *H04N 25/40* (2023.01); *H04N 25/58* (2023.01); *H04N 25/704* (2023.01); *H04N 25/75* (2023.01)

(58) Field of Classification Search
CPC ........ H04N 25/40; H04N 5/341; H04N 25/58; H04N 5/35536; H04N 25/704; H04N 5/36961; H04N 25/75; H04N 5/378
See application file for complete search history.

(56) References Cited

U.S. PATENT DOCUMENTS

| | | | |
|---|---|---|---|
| 2019/0068908 A1 | 2/2019 | Kobayashi et al. | |
| 2020/0021767 A1* | 1/2020 | Ikedo | H01L 31/035272 |
| 2020/0045251 A1* | 2/2020 | Koizumi | H04N 25/79 |
| 2020/0252563 A1* | 8/2020 | Yasuda | H04N 25/772 |
| 2020/0351464 A1 | 11/2020 | Ikedo | |

(Continued)

FOREIGN PATENT DOCUMENTS

| | | |
|---|---|---|
| JP | 2018157387 A | 10/2018 |
| JP | 201975610 A | 5/2019 |

(Continued)

OTHER PUBLICATIONS

Cristiano Niclass et al., "Design and Characterization of a CMOS 3-D Image Sensor Based on Signle Photon Avalanche Diodes", IEEE Journal of Solid-State Circuits, vol. 40, No. 9, Sep. 2005, pp. 1847-1854.

(Continued)

*Primary Examiner* — Nicholas G Giles
(74) *Attorney, Agent, or Firm* — Sughrue Mion, PLLC

(57) ABSTRACT

Provided is an image sensor using photon counting, the image sensor including a pixel including a plurality of sub-pixels, a plurality of counters which are respectively connected to the plurality of sub-pixels and configured to count and output a plurality of pulse signals generated based on photons incident on each of the plurality of sub-pixels, and an operator configured to perform an operation on an output value output from each of the plurality of counters.

20 Claims, 19 Drawing Sheets

(56) References Cited

U.S. PATENT DOCUMENTS

2020/0411701 A1   12/2020   Ota

FOREIGN PATENT DOCUMENTS

JP          2019110406 A    7/2019
KR    10-2019-0024744 A    3/2019

OTHER PUBLICATIONS

Claudio Bruschini et al, Single-photon avalanche diode Imagers in Biohotnics: review and Outlook, Light: Science & Applications(2019), 8:87, Total 28 pages.
Jun Ogi et al, "A 250fps 124dB Dynamic-Range SPAD Image Sensor Stacked with Pixel-Parallel Photon Counter Employing Sub-Frame Extrapolating Architecture for Motion Artifact Suppression", ISSCC 2021, Session 7, Imagers and range sensors 7.5, pp. 114-116, Feb. 16, 2021.
Yuki Maruyama et al, "A 1024×8, 700-ps Time-Gated SPAD Line Sensor for Planetary Surface Exploration With Laser Raman Spectroscopy and LIBS", Journal of.Solid-state Circuits vol. 49, No. 1, pp. 179-189, Jan. 2014.

* cited by examiner

IMAGE SENSOR, IMAGE ACQUISITION APPARATUS, AND ELECTRONIC APPARATUS WITH IMPROVED PERFORMANCE

CROSS-REFERENCE TO RELATED APPLICATION

This application claims priority to Korean Patent Application No. 10-2021-0146059, filed on Oct. 28, 2021, in the Korean Intellectual Property Office, the disclosure of which is incorporated by reference herein in its entirety.

BACKGROUND

1. Field

Example embodiments of the present disclosure relate to image sensors, image acquisition apparatuses, and electronic apparatuses including the image acquisition apparatuses.

2. Description of Related Art

Image sensors receive light incident thereon from an object and photoelectrically convert the received light into an electrical signal.

Such an image sensor uses a color filter consisting of an array of filter elements capable of selectively transmitting red light, green light, and blue light for color expression, senses the amount of light that passed through each filter element, and then forms a color image of an object through image processing.

Characteristics of image sensors such as resolution, frame rate, low light imaging, and high dynamic range (hereinafter, referred to as HDR) have been gradually improved. In order to simultaneously improve the HDR and frame rate, a new imaging method has been proposed, and recently, an image sensor to which photon counting imaging technology is applied has been developed.

Photon counting imaging uses a fast photodiode, for example, a single photon avalanche diode (hereinafter, referred to as SPAD), to count the number of photons incident on a pixel for a certain period of time on a time axis, measures the amount of light for each pixel, and generates a two-dimensional image.

SUMMARY

One or more example embodiments provide image sensors, image acquisition apparatuses, and electronic apparatuses including the image acquisition apparatuses.

Additional aspects will be set forth in part in the description which follows and, in part, will be apparent from the description, or may be learned by practice of example embodiments of the disclosure.

According to an aspect of an example embodiment, there is provided an image sensor using photon counting, the image sensor including a pixel including a plurality of sub-pixels, a plurality of counters which are respectively connected to the plurality of sub-pixels and configured to count and output a plurality of pulse signals generated based on photons incident on each of the plurality of sub-pixels, and an operator configured to perform an operation on an output value output from each of the plurality of counters.

Each of the plurality of sub-pixels may be a single photon avalanche diode (S PAD).

The plurality of sub-pixels may include a first sub-pixel and a second sub-pixel.

The operation may be any of an addition, a subtraction, a multiplication, and a division.

At least one operation from among the addition, the subtraction, the multiplication, and the division may be preset.

The operator may be further configured to output a result value obtained by performing a subtraction operation on a first output value output from a first counter connected to the first sub-pixel and a second output value output from a second counter connected to the second sub-pixel.

Sizes of the plurality of sub-pixels may be different from each other.

According to another aspect of an example embodiment, there is provided an image acquisition apparatus including a pixel array including a plurality of pixels that respectively includes a plurality of sub-pixels, a plurality of counters which are respectively connected to the plurality of sub-pixels and are configured to count and output a plurality of pulse signals generated based on photons incident on each of the plurality of sub-pixels, an operator configured to perform an operation on an output value output from each of the plurality of counters, and a processor configured to process an operation value output from an operator of each of the plurality of pixels.

Each of the plurality of sub-pixels may be a single photon avalanche diode (S PAD).

The operation may be any of an addition, a subtraction, a multiplication, and a division.

The processor may be further configured to set any operation from among the addition, the subtraction, the multiplication, and the division.

The plurality of sub-pixels may include a first sub-pixel and a second sub-pixel.

The operator may be further configured to output a result value obtained by performing a subtraction operation on a first output value output from a first counter connected to the first sub-pixel and a second output value output from a second counter connected to the second sub-pixel.

The processor may be further configured to perform a phase difference auto focusing (AF) based on a plurality of result values respectively output from operators of the pixel array.

The processor may be further configured to output a select signal for each of the plurality of sub-pixels.

A first sub-pixel from among the plurality of sub-pixels may be a pixel having a first luminance, and a second sub-pixel from among the plurality of sub-pixels is a pixel having a second luminance that is higher than the first luminance.

Sizes of the plurality of sub-pixels may be different from each other.

Each of the pixel array and a readout circuit may correspond to an M×N array, and, when the number of the plurality of sub-pixels is K, a resolution of an image obtained from the pixel array is K×M×N.

The pixel array, the plurality of counters, and the operator may be provided in a pixel, and the processor may be provided outside of the pixel.

According to another aspect of an example embodiment, there is provided an electronic apparatus including an image acquisition apparatus including a pixel array including a plurality of pixels that respectively includes a plurality of sub-pixels, a plurality of counters which are respectively connected to the plurality of sub-pixels and are configured to count and output a plurality of pulse signals generated based on photons incident on each of the plurality of sub-pixels, an operator configured to perform an operation on an output value output from each of the plurality of counters, and a processor configured to process an operation value output from an operator of each of the plurality of pixels.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
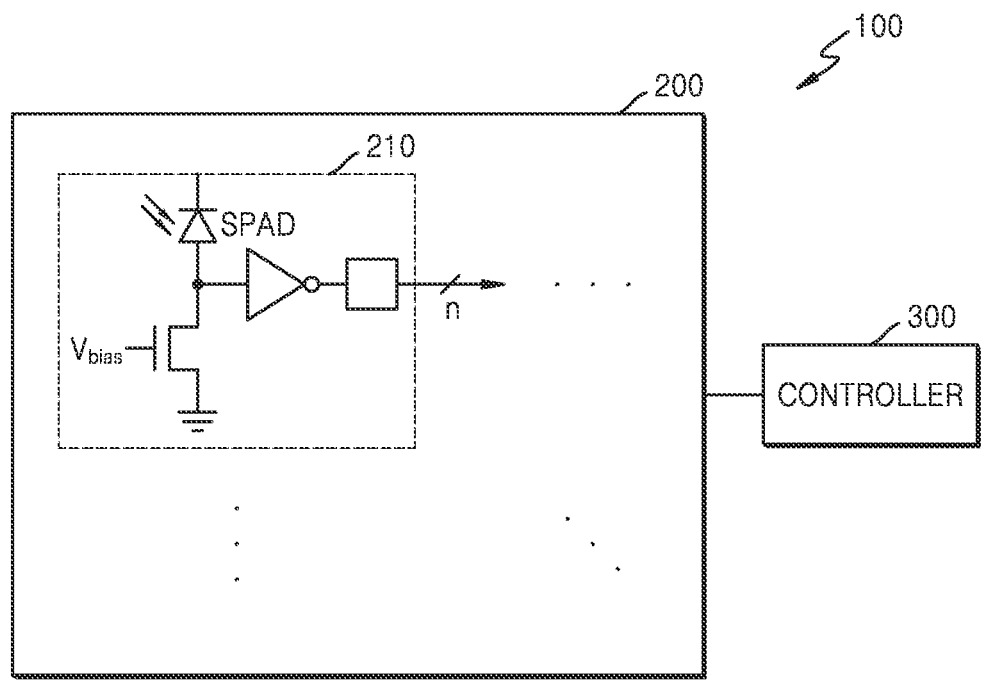
FIG. 1 is a schematic block diagram of an image acquisition apparatus according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. The example embodiments described below are only examples, and thus, it should be understood that the embodiments may be modified in various forms. In the drawings, like reference numerals refer to like elements throughout, and the sizes of elements may be exaggerated for clarity.

In the following description, when an element is referred to as being "above" or "on" another element, it may be directly on the other element while making contact with the other element or may be above the other element without making contact with the other element.

Although terms such as "first" and "second" are used to describe various elements, these terms are only used to distinguish one element from another element. These terms do not limit elements to having different materials or structures.

As used herein, the singular forms "a," "an," and "the" are intended to include the plural forms as well, unless the context clearly indicates otherwise. In addition, it will be understood that when a unit is referred to as "comprising" another element, it does not preclude the possibility that one or more other elements may exist or may be added.

In the present disclosure, terms such as "unit" or "module" may be used to denote a unit that has at least one function or operation and is implemented with hardware, software, or a combination of hardware and software.

An element referred to with the definite article or a demonstrative pronoun may be construed as the element or the elements even though it has a singular form.

Operations of a method may be performed in an appropriate order unless explicitly described in terms of order or described to the contrary. In addition, examples or exemplary terms (for example, "such as" and "etc.") are used for the purpose of description and are not intended to limit the scope of the present disclosure unless defined by the claims.

In an example embodiment, SPAD may be a next-generation semiconductor optical device with extremely high efficiency that is sufficient to detect a single photon with a very high gain characteristic of the device. In SPAD, when a voltage higher than a breakdown voltage of the device is applied, free electrons (carriers) are accelerated according to a very large electric field, causing a strong collision with an atom, and as a result, electrons bound to the atom are released, resulting in an impact ionization phenomenon in which the number of free electrons rapidly increases. This is called avalanche amplification, and due to this effect, the number of free electrons generated by photons irradiated from the outside to an image sensor is greatly increased. For example, even when the surrounding environment is very dark or light is irradiated from a very far distance, and only a very fine photon enters the image sensor, it may be recognized as if a lot of photons enter by amplifying these photons.

In imaging using photon counting, a two-dimensional image is implemented by measuring the amount of light per pixel by counting the number of photons incident on a pixel for a certain period of time on a time axis by using SPAD.

A related-art image sensor generates a two-dimensional image by transmitting, to an external readout circuit, a voltage change generated by accumulating incident photons in floating diffusion (FD) for a certain period of time. On the other hand, the image sensor using photon counting may make conversion into digital information in units of pixels.

A pixel for photon counting imaging includes a high-speed photodiode, a pulse generator, and a counter circuit. Each pixel operates independently, and when a photon is incident thereon, a current flows in the high-speed photodiode and a digital pulse is output from the pulse generator. The number of pulses of the digital pulse are continuously accumulated in a counter at a rear end. Therefore, by counting a pulse output of the counter within a given time, a digital value proportional to an amount of incident photons is obtained, and a two-dimensional image may be implemented. Photon counting imaging may implement high-speed shooting and HDR compared to existing image sensor, and a dynamic range of about 120 dB or more may be implemented.

In an example embodiment, an image sensor using photon counting arranges a plurality of sub-pixels in one pixel, counts and outputs a plurality of pulse signals generated according to photons incident on each of the sub-pixels, and performs an operation on the output values. Accordingly, pixel values read from the image sensor may not be transmitted to an image processing circuit (ISP) outside the pixel, and operations on the pixel values may be directly performed within the pixel.

In an example embodiment, the term "pixel" may be used to refer only to a photodiode that receives light, or to components or integrated circuits implemented in a pixel. For example, the term "pixel" may be used to collectively refer to a photodiode, a pulse generator, and a counter that implement one pixel.

In an example embodiment, the term "image sensor" may be used to refer to a photoelectric conversion device that senses light and converts the detected light into an electrical signal. Accordingly, the term "image sensor" may be used to collectively refer to a pixel or a pixel array, or a pixel a pixel circuit.

FIG. 1 is a schematic block diagram of an image acquisition apparatus 100 according to an example embodiment.

Referring to FIG. 1, the image acquisition apparatus 100 may include a pixel array 200 and a controller 300.

A certain number, for example, M×N, of a plurality of pixels 210 may be arranged in the pixel array 200. Each of the pixels 210 may be driven independently. The pixel array 200 may include peripheral circuits, a vertical scan circuit, a horizontal scan circuit, a read circuit, an output circuit, and a control circuit. The plurality of pixels 210 and the peripheral circuits may be arranged on different layers from each other. For example, a layer on which the plurality of pixels 210 are arranged may be stacked on a chip layer of the readout circuit. In an example embodiment, the pixel 210 is a SPAD and counts a single photon, and thus may have relatively low noise and high dynamic range.

In an example embodiment, a plurality of sub-pixels may be arranged in each of the pixels 210 of the pixel array 200. In the plurality of sub-pixels, the photodiode may be an avalanche photodiode (hereinafter, referred to as an APD) or a SPAD, which operate in a Geiger mode. Here, at least two sub-pixels may be arranged in one pixel 210. Each of the sub-pixels may have the same size or different sizes. In addition, two sub-pixels may be implemented in which one of the two-sub-pixels may be used for low luminance and the other one may be used for high luminance. Therefore, the light sensing efficiency may be increased even in low luminance, which is an advantage of the SPAD, and the counter that counts photons absorbed by the SPAD may be prevented from overflowing in high luminance.

Each pixel 210 may include a photodiode, a pulse generator, a counter, and an operator. In an example embodiment, the pulse generator may generate a pulse signal based on an electrical signal generated according to photons incident on the photodiode. The counter may count the number of pulse signals output from the pulse generator at a certain time and output the pulse signals. The operator may calculate (obtain) and output a counting value obtained by counting photons of each of the sub-pixels. Here, the operation may be any of an addition, a subtraction, a multiplication, and a division, and may be preset.

A structure and detailed operation of the pixel 210 or sub-pixels are described below with reference to FIGS. 2 and 3.

The controller 300 may process operation values for a plurality of sub-pixels output from the pixel array 200. For example, when a subtraction operation is performed on the plurality of sub-pixels, the controller 300 may perform a phase difference AF by using the subtraction operation. In addition, the controller 300 may generate an image signal by using output values of the plurality of sub-pixels. In this case, an image having a resolution as large as the number of sub-pixels may be obtained even by using a readout circuit having the same size. Here, the output values may include a counting value of a counter of each pixel or sub-pixel and a period of the pulse signal. In an example embodiment, after calculating the counting value of each sub-pixel, the calculation result value may be transmitted to the controller 300. In addition, the counting values of the counter of each of the sub-pixels may be provided to the controller 300 without calculation.

Figure 2:
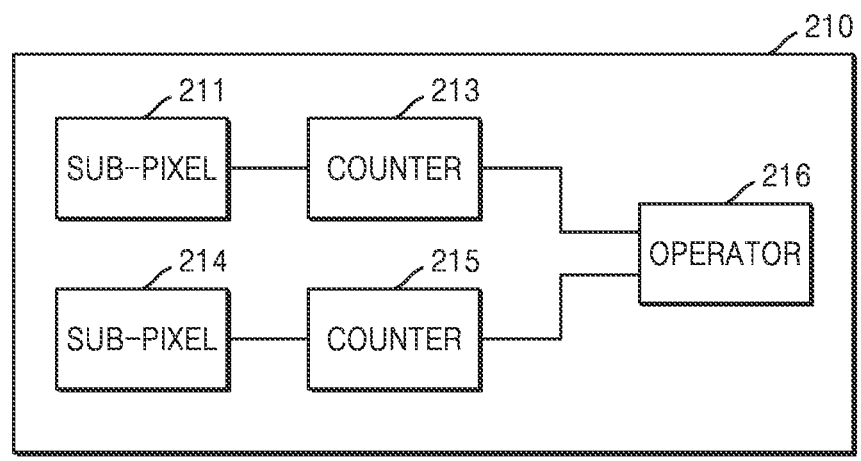
FIG. 2 is a detailed block diagram of an image sensor shown in FIG. 1.

FIG. 2 is a detailed block diagram of an image sensor 210 shown in FIG. 1.

Referring to FIG. 2, the image sensor 210 or one pixel 210 may include two sub-pixels 211 and 214, two counters 213 and 215 respectively connected to the sub-pixels 211 and 214, and an operator 216 may perform an operation on counting values of each of the counters 213 and 215. Each of the sub-pixels 211 and 214 may include a pulse generator that generates a pulse according to photons absorbed by the respective sub-pixels.

The image sensor 210 may sense the amount of light by counting the number of photons incident on the pixel for a certain period of time, i.e., an exposure period, by using a trigger pulse induced by the photons.

Each of the sub-pixels 211 and 214 may include a photodiode. The photodiode may include an APD or a SPAD, which operate in a Geiger mode. In Geiger mode, a reverse voltage greater than a breakdown voltage may be applied to detect a single photon in the APD. In Geiger mode, because a strength of an electric field applied to an amplification layer is relatively large, even when a relatively small amount of photons are absorbed, a breakdown of an avalanche current occurs and a large current pulse is output, and thus, single photons may be detected. The pulse generator may generate a pulse signal based on an electrical signal generated according to photons incident on the sub-pixels 211 and 214. The pulse generator may generate a pulse having a frequency according to a light reception frequency of photons.

The counters 213 and 215 may output pulse signals by counting the number of the pulse signals. A counting value or counting result value output from the counters 213 and 215 may become a pixel value. Here, the counting value may be the sum of the number of photons input in a frame period. The counters 213 and 215 may temporarily store the counting value and output the counting value according to an external control signal.

The operator 216 may perform an operation on the counting values output from the respective counters 213 and 215. Here, the operation may be any of an addition, a subtraction, a multiplication, and a division, and may be preset in the image sensor 210. In an example embodiment, the counting values output from the respective counters 213 and 215 may be numerical digital values for the number of photons. The operator 216 may perform an arithmetic operation on the digital values. The operator 216 may include an arithmetic logic unit (hereinafter, referred to as an ALU).

The ALU may be designed to perform arithmetic operations on two numbers such as addition and subtraction, and logical operations such as exclusive OR, AND, and OR. The ALU may perform integer-type calculation operations including addition, subtraction, multiplication, and division. In addition, the ALU may perform a bit logic operation and a bit shift operation.

Figure 3:
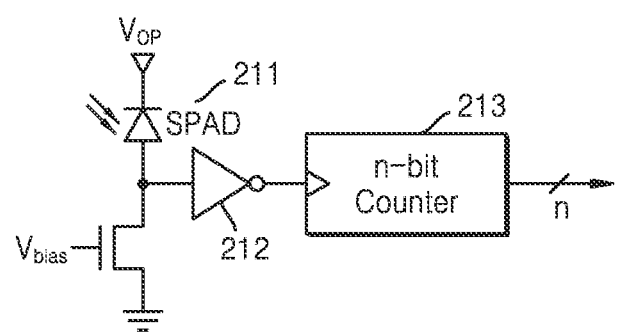
FIG. 3 is a circuit diagram of the image sensor shown in FIG. 2.

FIG. 3 is a circuit diagram of the sub-pixel 211 shown in FIG. 2.

Referring to FIG. 3 together, the sub-pixel 211 may include a photodiode. In addition, the pixel 211 may include a SPAD. A cathode electrode of the photodiode 211 may be connected to an operating voltage Vop, and an anode electrode thereof may be connected to an n-channel metal-oxide-semiconductor field-effect transistor (MOSFET) (NMOS) and an input side of a pulse generator 212. A gate electrode of the NMOS transistor may be connected to a bias voltage Vbias.

The pulse generator 212 may include an inverter circuit. An output of the pulse generator 212 may be connected to the counter 213.

The counter 213 may be in n bits, for example, 8 to 12 bits. A size of the counter is not limited thereto, and counters having various sizes may be used according to a pixel size or application of the image sensor 210. The counter 213 may include a synchronous counter, an asynchronous counter, or an asynchronous ripple counter. The counter 213 may include a D-flip-flop circuit.

Referring to FIG. 3, when a reverse bias voltage greater than the breakdown voltage is applied to the cathode electrode of the SPAD 211 as the operating voltage Vop, carriers generated by incidence of a single photon cause avalanche amplification so that a large current is applied to the input side of the pulse generator 212 through the SPAD 211.

The pulse generator 212 may generate an electrical signal applied to the input side thereof, as a pulse signal. Here, the pulse generator 212 may include an inverter circuit.

By applying a bias voltage to the gate electrode of the NMOS transistor, the NMOS transistor may be turned and off, and a current generated in the SPAD 211 may be transferred to the pulse generator 212. Here, although the NMOS transistor is shown, embodiments are not limited thereto, and various bias voltage application circuits may be applied.

A quenching circuit for limiting excessive current caused by avalanche amplification generated in the SPAD 211 may be further included. As the reverse voltage applied to the SPAD increases, a probability that thermal electrons are in an excited state and a tunneling probability increase, and thus, a dark current in which an avalanche current is generated increases even without photon absorption. When the avalanche current is generated, an excess current may flow. Therefore, a continuous flow of the avalanche current may be suppressed by the quenching circuit.

Figure 4:
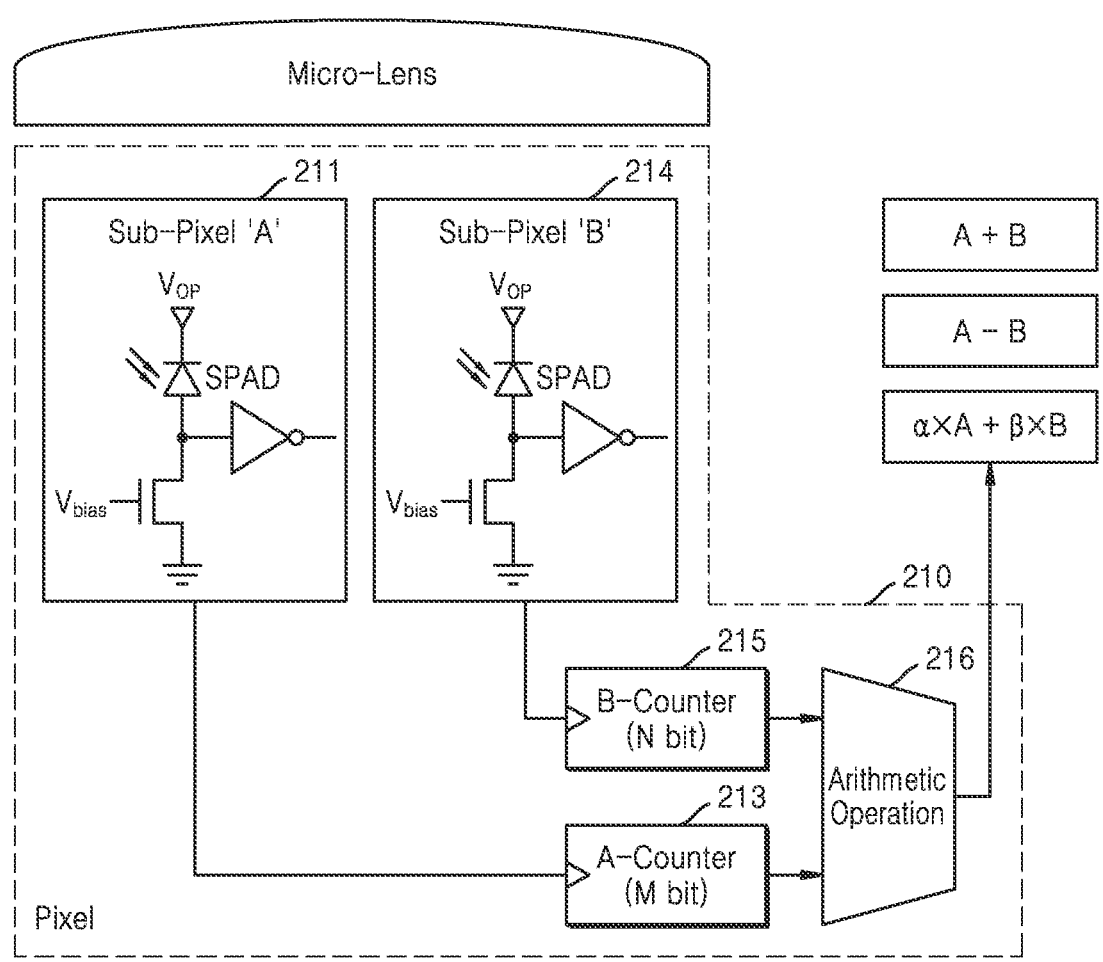
FIG. 4 is a detailed block diagram of the image sensor including a plurality of sub-pixels according to another example embodiment.

FIG. 4 is a detailed block diagram of the image sensor 210 including a plurality of sub-pixels according to another example embodiment.

Referring to FIG. 4, a pixel structure is shown in which one pixel includes a plurality of sub-pixels, and each of the sub-pixels may convert information corresponding to the amount of light into a digital value by photon counting and calculate and output a result value.

Two sub-pixels 211 and 214 may be arranged in the one pixel, and the sub-pixels 211 and 214 and the counters 213 and 215 are respectively connected to each other. Accordingly, pulse signals generated by photons absorbed in the sub-pixel 211 may be counted by the counter 213, and pulse signals generated by photons absorbed in the sub-pixel 214 may be counted by the counter 215. Counting values (the respective sub-pixel values) counted by the counters 213 and 215 may be input to the operator 216.

The operator 216 may perform an arithmetic operation and output the result value to the outside of the pixel. Here, the operation may be any of an addition, a subtraction, a multiplication, and a division, and any combinations thereof.

In an example embodiment, a type of operation within the pixel may be preset, and the type of operation may vary according to the application of the image sensor 210. For example, when used in dual photodiode autofocus (hereinafter, referred to as "2PDAF") or phase difference autofocus (PDAF), the operation is to perform an AF from a difference (phase difference) between pixel values of the respective sub-pixels, and thus, a subtraction operation may be performed. When a PDAF function is to be performed, two sub-pixels are provided, and the subtraction operation is performed. Therefore, because an in-pixel operation is possible without external ISP support, faster results may be obtained and an improved autofocusing function is possible.

Figure 5:
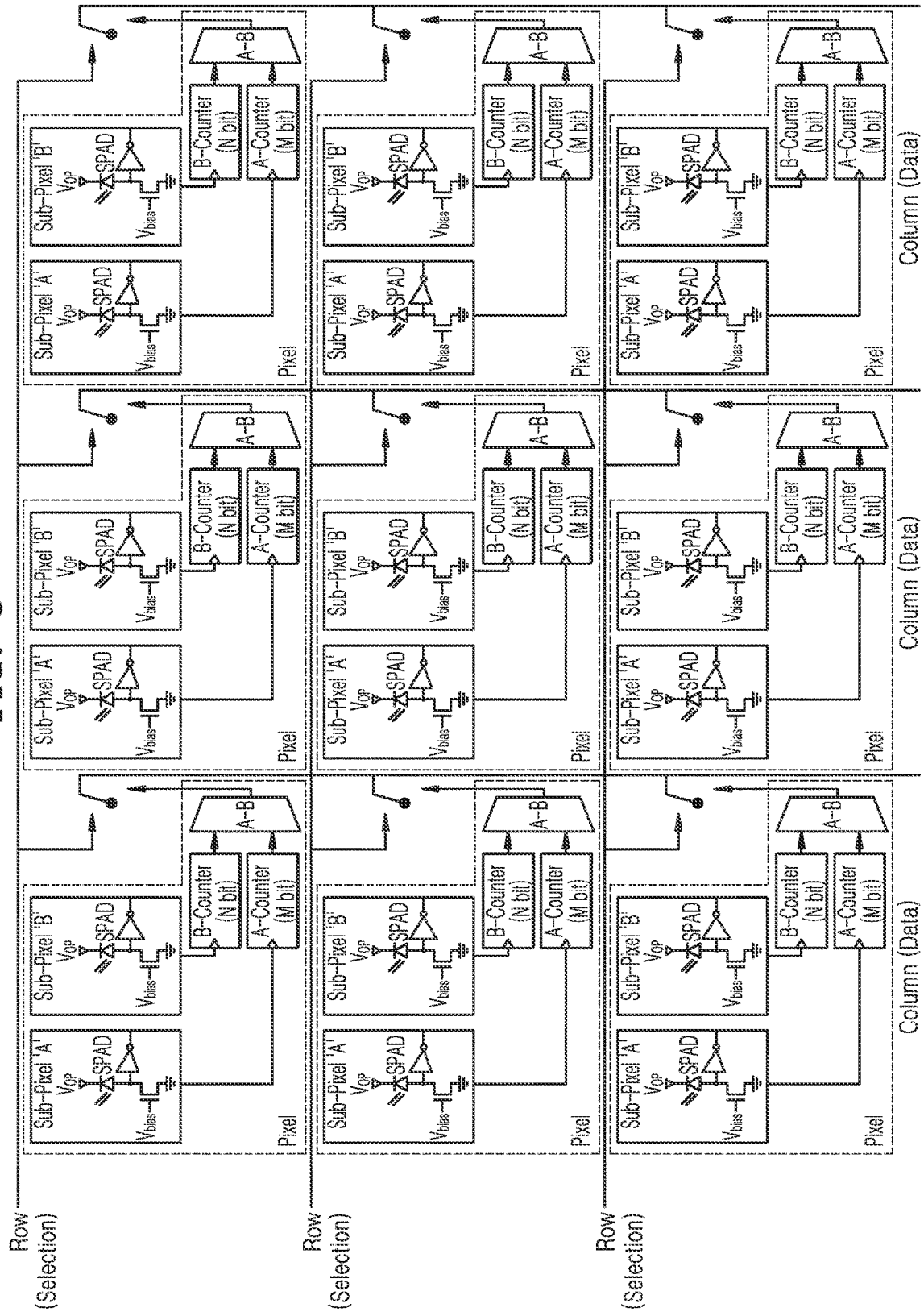
FIG. 5 is a circuit diagram of a pixel array including a plurality of sub-pixels according to another example embodiment.

FIG. 5 is a circuit diagram of a pixel array including a plurality of sub-pixels according to another example embodiment.

Referring to FIG. 5, a circuit design for performing a PDAF using 9 pixels each including two sub-pixels is shown. Here, the circuit design is only an example, and is not limited thereto.

In AF using PDAF, a difference in the amount of light incident on two individual sub-pixels in one pixel including two sub-pixels may be used. A position of a lens may be optimized by using the information to form a focus on a two-dimensional (2D) array surface so that clear image information may be ensured. A case of having a structure using the proposed method in order to perform these functions is described below.

First, because each pixel has an operation function, it is set as to which operation is to be performed. When the setting is completed, exposure and readout functions of the image sensor may be performed in the same way. Here, because the image information outputs a value for which "A-B" calculation is completed, AF may be completed by optimizing the position of a camera lens without additional ISP processing.

In FIG. 5, in order to perform PDAF by using two sub-pixels, a result value of a subtraction operation is output. However, embodiments are not limited thereto, and result values of various operations may be output.

In another example embodiment, a plurality of sub-pixels are arranged in a pixel, and thus, an arithmetic operation may be performed. However, information about the sub-pixels may be individually used. For example, a pixel structure including two sub-pixels may have an M×N array in units of pixels. Here, when the sub-pixels are individually used, image information having a 2×M×N resolution may be obtained. For example, although a readout circuit has an M×N resolution, an image may have an amount of information or resolution that is twice that of an image output from the image sensor.

Figure 6:
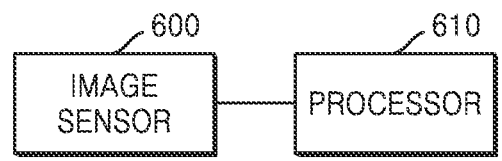
FIG. 6 is a schematic block diagram of an image acquisition apparatus according to another example embodiment.

FIG. 6 is a schematic block diagram of an image acquisition apparatus according to another example embodiment.

Referring to FIG. 6, the image acquisition apparatus may include an image sensor 600 and a processor 610.

The image sensor 600 may include a plurality of sub-pixels arranged in one pixel, a plurality of counters which are respectively connected to the sub-pixels and count and output a plurality of pulse signals generated according to photons incident on each of the sub-pixels, and an operator that performs an operation on output values output from each of the counters.

The processor 610 may process operation values output from the operator of the image sensor 600. Because the operation values include pixel values of the respective sub-pixels, desired operation values may be directly obtained by using various preset operation methods. Accordingly, the calculated pixel values may be used in the processor 610 without a separate operation.

In an example embodiment, the processor 610 may set an arithmetic operation of the image sensor 600 to suit a desired application.

In an example embodiment, the processor 610 may control to output only a pixel value of any sub-pixel from among the plurality of sub-pixels of the image sensor 600. For example, in a case in which the plurality of sub-pixels have different sizes from one another, where one is for a relatively low luminance and the other one is for a relatively high luminance, when it is determined to be a low luminance situation, the processor 610 may control to output only a pixel value of the sub-pixel for low luminance.

In an example embodiment, the processor 610 may control pixel values of the plurality of sub-pixels of the image sensor 600 to be individually output. In this case, an operation of the operator may be turned off, and an output value of each of the sub-pixels may be output. In this case, when the image sensor 600 is implemented as M×N pixel arrays, and K pixel arrays are included in one sub-pixel, the obtained image may have a resolution of K×M×N.

Figure 7:
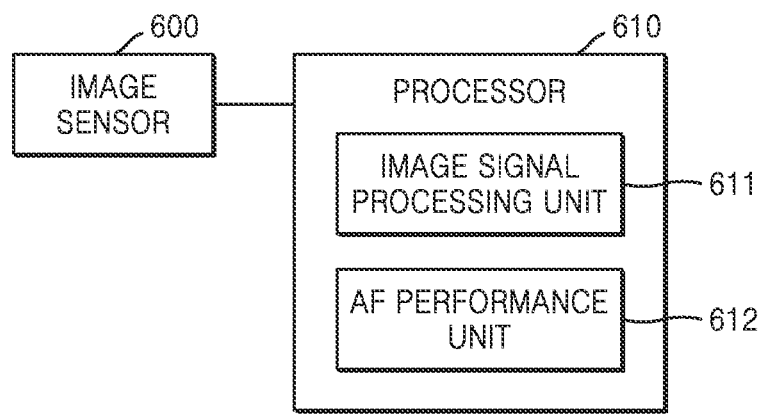
FIG. 7 is a schematic block diagram of an image acquisition apparatus according to another example embodiment.

FIG. 7 is a schematic block diagram of an image acquisition apparatus according to another example embodiment.

Referring to FIG. 7, the image acquisition apparatus may include the image sensor 600 and the processor 610, and the processor 610 may include an image signal processing unit 611 and an AF performance unit 612.

The image signal processing unit 611 may generate an image signal based on a pixel value obtained from the image sensor 600. After obtaining an image from the image sensor 600, the image signal processing unit 611 may perform basic image processing before or after the image is stored in a memory. For example, the ISP may perform bad pixel correction, fixed pattern noise correction, crosstalk reduction, remosaicing, demosaicing, false color reduction, denoising, chromatic aberration correction, or the like.

The AF performance unit 612 may focus by moving the position of the lens based on a pixel difference value of each of the sub-pixels obtained from the image sensor 600. In an example embodiment, even when the pixel difference value is operated within the processor 610, the pixel difference values may be directly received from the image sensor 600 to perform AF, and thus, fast AF may be implemented.

Figure 8:
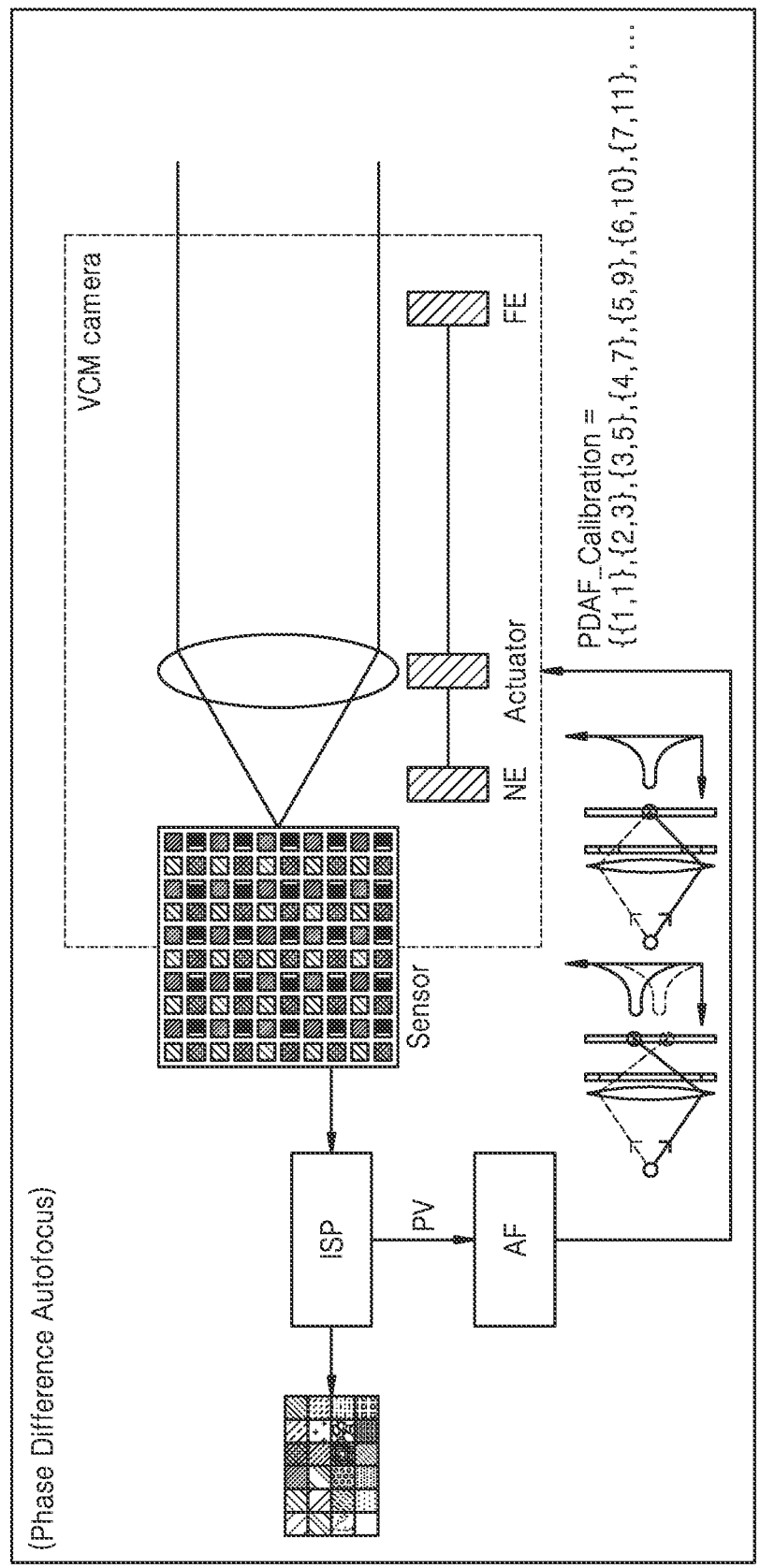
FIGS. 8 and 9 are diagrams illustrating a phase difference autofocus (AF) according to another example embodiment.
Figure 9:
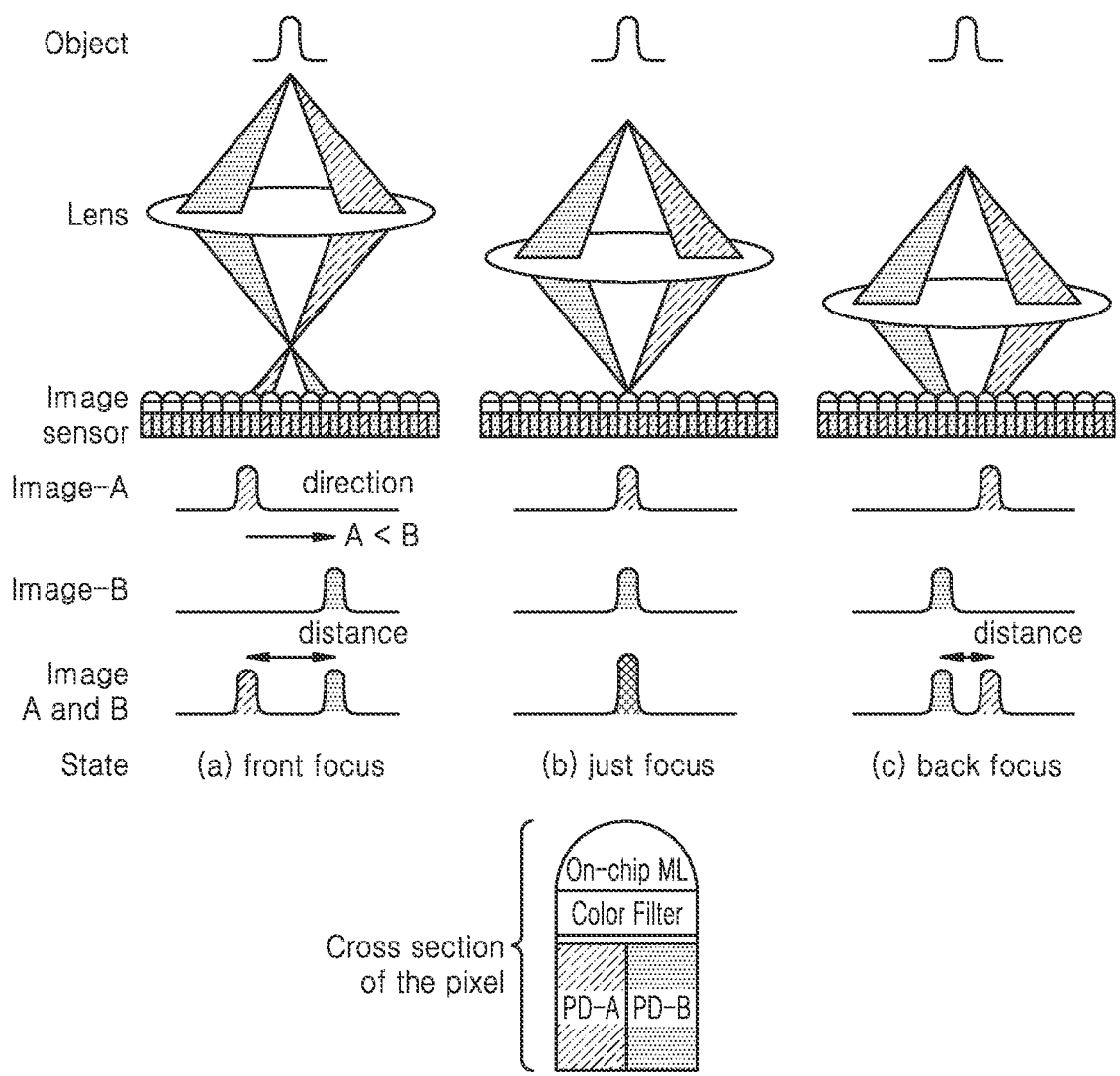

FIGS. 8 and 9 are diagrams illustrating a phase difference AF according to another example embodiment. Referring to FIG. 8, a related-art PDAF is shown. As an AF method of a camera, contrast detection autofocus (CDAF), phase detection autofocus (PDAF), and laser AF may be mainly used. In an example embodiment, the AF method is PDAF, and as shown in FIG. 8, a sensor structure including two individual pixels in a sensor may be required. The camera performs a focusing function in order to ensure clear image quality for an object. In the PDAF method, individual information within a pixel may be transmitted to an external circuit so that calculation is performed by using an ISP, and a lens position of the camera may be optimized by using the result value.

Referring to FIG. 9, the 2PDAF method is shown. The 2PDAF method is a method of using individual pixels of a sensor to operate a focus of a camera at high speed. As shown in FIG. 9, AF may be performed by dividing a pixel into two sub-pixels and comparing the amount of light incident on the sub-pixels with each other.

In the method described with reference to FIGS. 8 and 9, a series of operations of reading out in-pixel information, converting analog information into digital information, and performing calculation by using an ISP requires a processing time and power consumption.

Because digital information is generated in a pixel by using photon counting according to an example embodiment and an operation is performed thereon, PDAF may be performed without the help of an existing external ISP. Thus, the AF speed may be improved, and power consumption of the image acquisition apparatus may be reduced.

The image acquisition apparatus 1000 described above may be employed in various high-performance optical devices or high-performance electronic apparatuses. Examples of the electronic apparatuses may include smartphones, mobile phones, cellular phones, personal digital assistants (PDAs), laptop computers, personal computers (PCs), various portable devices, home appliances, security cameras, medical cameras, automobiles, Internet of Things (IoT) devices, and mobile or non-mobile computing devices, but are not limited thereto.

In addition to the image acquisition apparatus 1000, the electronic apparatus may further include a processor for controlling image sensors provided therein, for example, an application processor (AP), may control a plurality of hardware or software components by driving an operating system or an application program through a processor, and may perform various data processing and operations. The processor may further include a graphics-processing unit (GPU) and/or an image signal processor. When the processor includes an image signal processor, an image (or video) obtained by the image sensor may be stored and/or output using the processor.

Figure 10:
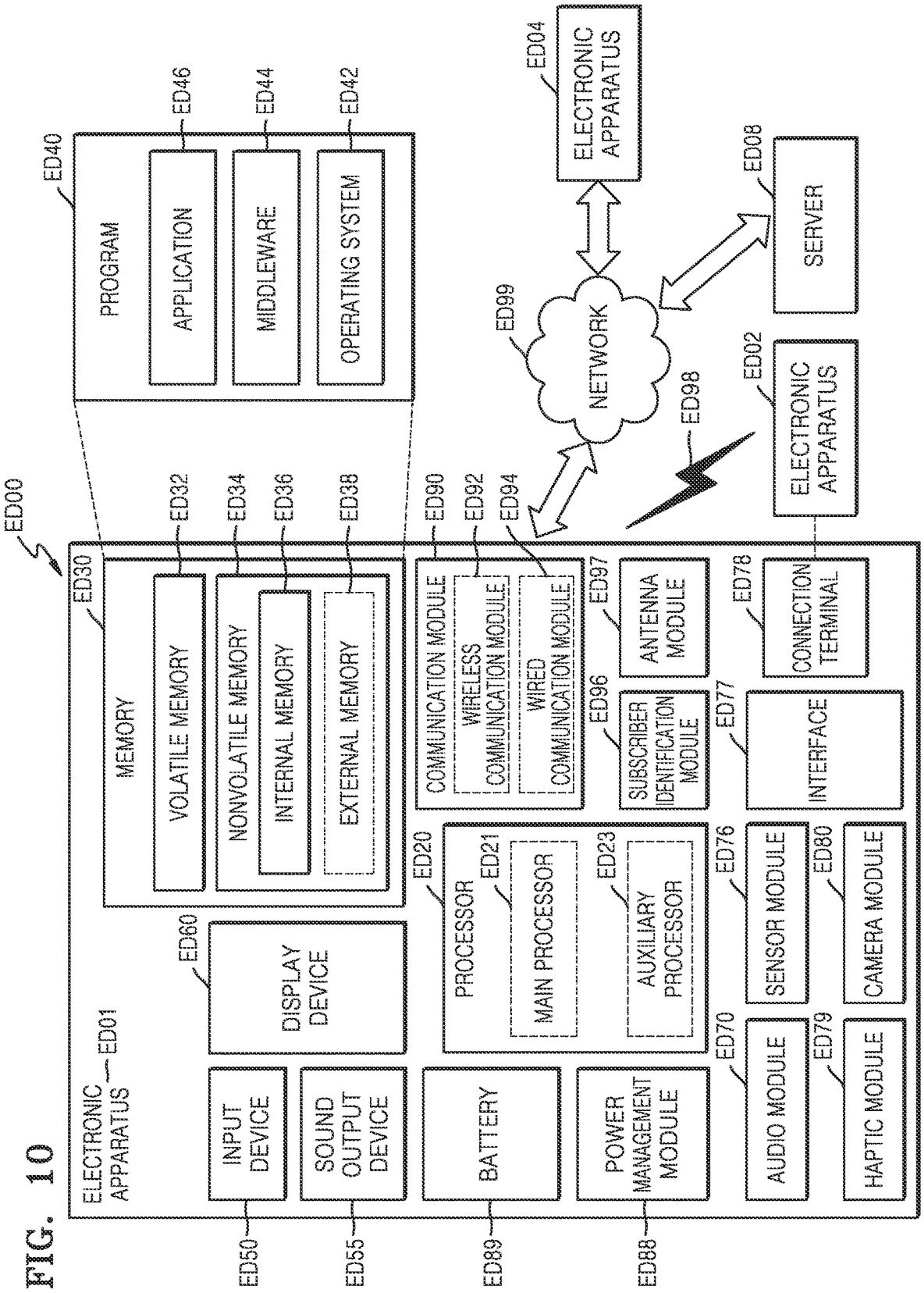
FIG. 10 is a block diagram of a schematic structure of an electronic apparatus according to another example embodiment.

FIG. 10 is a block diagram including a schematic structure of an electronic apparatus ED01 according to an embodiment. Referring to FIG. 10, in a network environment ED00, the electronic apparatus ED01 may communicate with another electronic apparatus ED02 through a first network ED98 (a near-field wireless communication network or the like) or may communicate with another electronic apparatus ED04 and/or a server ED08 through a second network ED99 (a far-field wireless communication network or the like). The electronic apparatus ED01 may communicate with the electronic apparatus ED04 through the server ED08. The electronic apparatus ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. Some (the display device ED60, etc.) of the components may be omitted from the electronic apparatus ED01, or other components may be added to the electronic apparatus ED01. Some of the components may be implemented in one integrated circuit. For example, the sensor module ED76 (a fingerprint sensor, an iris sensor, an illuminance sensor, etc.) may be embedded in the display device ED60 (a display or the like). In addition, when an image sensor has a spectral function, some sensor-module functions (color sensing, illuminance sensing, etc.) may be implemented in the image sensor instead of being implemented in the sensor module ED76.

The processor ED20 may execute software (a program ED40 or the like) to control one or more other components (hardware or software components, etc.) of the electronic apparatus ED01 connected to the processor ED20, and may perform a variety of data processing or operations. As a portion of the data processing or operations, the processor ED20 may load instructions and/or data received from other components (the sensor module ED76, the communication module ED90, etc.) into a volatile memory ED32, process the instructions and/or data stored in the volatile memory ED32, and store result data in a nonvolatile memory ED34. The processor ED20 may include a main processor ED21 (a central processing unit, an application processor, or the like) and an auxiliary processor ED23 (a GPU, an ISP, a sensor hub processor, a communication processor, or the like), which is operated independently or together with the main processor ED21. The auxiliary processor ED23 may consume less power than the main processor ED21 and may perform specialized functions.

The auxiliary processor ED23 may control functions and/or states related to some (the display device ED60, the sensor module ED76, the communication module ED90, etc.) of the components of the electronic apparatus ED01 on behalf of the main processor ED21 while the main processor ED21 is in an inactive (e.g., sleep) state or together with the main processor ED21 while the main processor ED21 is in an active (e.g., application execution) state. The auxiliary processor ED23 (an ISP, a communication processor or the like) may be implemented as a portion of other functionally relevant components (the camera module ED80, the communication module ED90, etc.).

The memory ED30 may store a variety of data required by the components (the processor ED20, the sensor module ED76, etc.) of the electronic apparatus ED01. The data may include, for example, software (the program ED40, etc.) and input data and/or output data for commands related thereto. The memory ED30 may include the volatile memory ED32 and/or the nonvolatile memory ED34. The nonvolatile memory ED32 may include an internal memory ED36 fixed to the electronic apparatus ED01 and an external memory ED38 removable from the electronic apparatus ED01.

The program ED40 may be stored as software in the memory ED30, and may include an operating system ED42, middleware ED44, and/or an application ED46.

The input device ED50 may receive commands and/or data to be used for the components (the processor ED20, etc.) of the electronic apparatus ED01 from the outside (a user, etc.) of the electronic apparatus ED01. The input device ED50 may include a microphone, a mouse, a keyboard, and/or a digital pen (a stylus pen or the like).

The audio output device ED55 may output an audio signal to the outside of the electronic apparatus ED01. The audio output device ED55 may include a speaker and/or a receiver. The speaker may be used for general purposes such as multimedia playback or record playback, and the receiver may be used to receive incoming calls. The receiver may be provided as a portion of the speaker or may be implemented as a separate device.

The display device ED60 may visually provide information to the outside of the electronic apparatus ED01. The display device ED60 may include a display, a hologram device, or a projector, and a control circuit for controlling devices. The display device ED60 may include touch circuitry set to sense a touch, and/or sensor circuitry (a pressure sensor, etc.) configured to measure the intensity of force generated by the touch.

The audio module ED70 may convert sound into an electrical signal, and vice versa. The audio module ED70 may obtain sound through the input device ED50, or may output sound through the audio output device ED55 and/or speakers and/or headphones of another electronic apparatus (the electronic apparatus ED02 or the like) directly or wirelessly connected to the electronic apparatus ED01.

The sensor module ED76 may detect an operating state (power, temperature, etc.) of the electronic apparatus ED01 or an external environmental state (user status, etc.), and may generate an electrical signal and/or a data value corresponding to the detected state. The sensor module ED76 may include a gesture sensor, a gyro sensor, a barometric sensor, a magnetic sensor, an acceleration sensor, a grip sensor, a proximity sensor, a color sensor, an infrared (IR) sensor, a biological sensor, a temperature sensor, a humidity sensor, and/or an illuminance sensor.

The interface ED77 may support one or more designated protocols, which may be used to directly or wirelessly connect the electronic apparatus ED01 with other electronic apparatuses (the electronic apparatus ED02, etc.). The interface ED77 may include a high definition multimedia interface (HDMI), a universal serial bus (USB) interface, a secure digital (SD) card interface, and/or an audio interface.

A connection terminal ED78 may include a connector through which the electronic apparatus ED01 may be physically connected to other electronic apparatuses (the electronic apparatus ED02, etc.). The connection terminal ED78 may include an HDMI connector, a USB connector, an SD card connector, and/or an audio connector (a headphone connector, etc.).

The haptic module ED79 may convert an electrical signal into a mechanical stimulus (vibration, movement, etc.) or an electrical stimulus that a user may perceive through tactile sensation or kinesthesia. The haptic module ED79 may include a motor, a piezoelectric element, and/or an electric stimulation device.

The camera module ED80 may capture a still image and a moving image. The camera module ED80 may include the image acquisition apparatus 1000 described above, and may further include a lens assembly, an ISP, and/or a flash. The lens assembly included in the camera module ED80 may collect light coming from an object to be imaged.

The power management module ED88 may manage power supplied to the electronic apparatus ED01. The power management module ED88 may be implemented as a portion of a power management integrated circuit PMIC.

The battery ED89 may supply power to components of the electronic apparatus ED01. The battery ED89 may include a non-rechargeable primary battery, a rechargeable secondary battery, and/or a fuel cell.

The communication module ED90 may support establishment of a direct (wired) communication channel and/or a wireless communication channel between the electronic apparatus ED01 and other electronic apparatuses (the electronic apparatus ED02, the electronic apparatus ED04, the server ED08, etc.), and communication through the established communication channel. The communication module ED90 operates independently of the processor ED20 (an application processor, etc.) and may include one or more communication processors supporting direct communication and/or wireless communication. The communication module ED90 may include a wireless communication module ED92 (a cellular communication module, a short-range wireless communication module, a global navigation satellite system (GNSS), or the like) and/or a wired communication module ED94 (a local area network (LAN) communication module, a power line communication module, or the like). A corresponding communication module from among these communication modules may communicate with other electronic apparatuses through the first network ED98 (a local area network such as Bluetooth, WiFi Direct, or infrared data association (IrDA)) or the second network ED99 (a telecommunication network such as a cellular network, the Internet, or computer networks (LAN, WAN, etc.)). These various types of communication modules may be integrated into a single component (a single chip or the like) or may be implemented as a plurality of separate components (multiple chips). The wireless communication module ED92 may identify and authenticate the electronic apparatus ED01 within a communication network such as the first network ED98 and/or the second network ED99 using subscriber information (an international mobile subscriber identifier (IMSI), etc.) stored in the subscriber identification module ED96.

The antenna module ED97 may transmit and/or receive signals and/or power to and/or from the outside (other electronic apparatuses, etc.). An antenna may include a radiator made of a conductive pattern formed on a substrate (a PCB, etc.). The antenna module ED97 may include one or more such antennas. When a plurality of antennas are included in the antenna module ED97, the communication module ED90 may select an antenna suitable for a communication method used in a communication network, such as the first network ED98 and/or the second network ED99, among the plurality of antennas. Signals and/or power may be transmitted or received between the communication module ED90 and other electronic apparatuses through the selected antenna. Other components (an RFIC, etc.) besides the antenna may be included as part of the antenna module ED97.

Some of the components may be connected to each other and exchange signals (commands, data, etc.) through a communication method between peripheral devices (a bus, general purpose input and output (GPIO), a serial peripheral interface (SPI), a mobile industry processor interface (MIPI), or the like).

Commands or data may be transmitted or received between the electronic apparatus ED01 and an external apparatus such as the electronic apparatus ED04 through the server ED08 connected to the second network ED99. The other electronic apparatuses ED02 and ED04 may be the same as or different from the electronic apparatus ED01. All or some of the operations of the electronic apparatus ED01 may be executed by one or more of the other electronic apparatuses ED02, ED04, and ED08. For example, when the electronic apparatus ED01 needs to perform certain functions or services, the electronic apparatus ED01 may request one or more other electronic apparatuses to perform some or all of the functions or services instead of directly executing the functions or services. One or more other electronic apparatuses that have received the request may execute an additional function or service related to the request, and may transfer results of the execution to the electronic apparatus ED01. To this end, cloud computing, distributed computing, and/or client-server computing techniques may be used.

Figure 11:
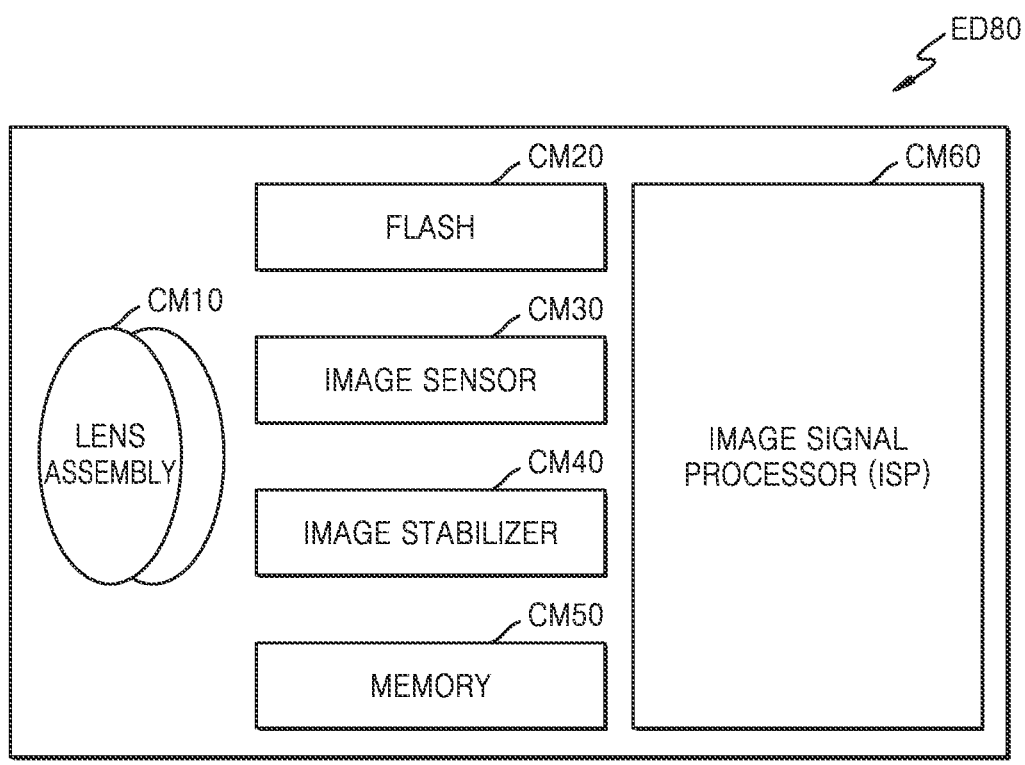
FIG. 11 is a block diagram schematically illustrating a camera module provided in the electronic apparatus of FIG. 10.

FIG. 11 is a block diagram schematically illustrating the camera module ED80 included in the electronic apparatus ED01 shown in FIG. 10. The camera module ED80 may include the image acquisition apparatus 1000 described above, or may have a structure modified therefrom. Referring to FIG. 11, the camera module ED80 may include a lens assembly CM10, a flash CM20, an image sensor CM30, an image stabilizer CM40, a memory CM50 (a buffer memory, etc.), and/or an ISP CM60.

The image sensor CM30 is an image sensor described with reference to FIGS. 1 to 3, and includes a plurality of sub-pixels arranged in one pixel, a plurality of counters which are respectively connected to the sub-pixels and count and output a plurality of pulse signals generated according to photons incident on the respective sub-pixels, and an operator that performs an operation on an output value output from each of the counters. Accordingly, by using photon counting technology, the image sensor CM30 may directly perform an operation on pixel values in a pixel without transmitting a pixel value read from the image sensor CM30 to an ISP outside the pixel. In addition, by performing, in a pixel, a processing operation in which pixel values may be operated, for example, a pixel value operation for 2PDAF, the AF speed may be improved, and power consumption of the image acquisition apparatus may be reduced. In addition, by including a plurality of sub-pixels, the individual sub-pixels may be selectively driven to obtain a pixel value, and thereby an image having a resolution as large as the number of sub-pixels may be obtained even by using a readout circuit having the same size.

The lens assembly CM10 may collect light coming from an object to be imaged. The camera module ED80 may include a plurality of lens assemblies CM10, and in this case, the camera module ED80 may be a dual camera, a 360-degree camera, or a spherical camera. Some of the plurality of lens assemblies CM10 may have the same lens properties (field of view, focal length, autofocus, F Number, optical zoom, etc.) or different lens properties. Each of the lens assemblies CM10 may include a wide-angle lens or a telephoto lens.

The lens assembly CM10 may be configured and/or focused such that an image sensor included in the image sensor CM30 may form optical images of an object.

The flash CM20 may emit light used to enhance light emitted or reflected from an object. The flash CM20 may include one or more light emitting diodes (a red-green-blue (RGB) LED, a white LED, an infrared LED, an ultraviolet LED, etc.), and/or a xenon lamp.

The image stabilizer CM40 may move one or more lenses included in the lens assembly CM10 or the image sensor CM30 in a specific direction in response to a movement of the camera module ED80 or the electronic apparatus ED01 including the camera module ED80, or may control operating characteristics of the image sensor CM30 (adjustment of read-out timing, etc.) to compensate for negative effects caused by movement. The image stabilizer CM40 may detect a movement of the camera module ED80 or the electronic apparatus ED01 by using a gyro sensor (not shown) or an acceleration sensor (not shown) arranged inside or outside the camera module ED80. The image stabilizer CM40 may be an optical image stabilizer.

In the memory CM50, some or all of data obtained through the image sensor CM30 may be stored for the next image processing operation. For example, when a plurality of images are obtained at a high speed, the obtained original data (Bayer-patterned data, high-resolution data, or the like) may be stored in the memory CM50 and only a low-resolution image may be displayed. Then, the original data of a selected image (user selection, etc.) may be transferred to the ISP CM60. The memory CM50 may be integrated into the memory ED30 of the electronic apparatus ED01 or may be configured as a separate memory that may be independently operated.

The ISP CM60 may perform one or more image processes on an image obtained through the image sensor CM30 or image data stored in the memory CM50.

In addition, the one or more image processes may include depth map generation, three-dimensional modeling, panorama generation, feature point extraction, image synthesis, and/or image compensation (noise reduction, resolution adjustment, brightness adjustment, blurring, sharpening, softening, etc.). The ISP CM60 may control (exposure time control, read-out timing control, etc.) components (the image sensor CM30, etc.) included in the camera module CM80. An image processed by the ISP CM60 may be stored again in the memory CM50 for additional processing or may be provided to external components (the memory ED30, the display device ED60, the electronic apparatus ED02, the electronic apparatus ED04, the server ED08, etc.) of the camera module ED80. The ISP CM60 may be integrated into the processor ED20 or may be configured as a separate processor that operates independently of the processor ED20. When the ISP CM60 is provided separately from the processor ED20, an image processed by the ISP CM60 may be displayed on the display device ED60 after being further processed by the processor ED20.

The electronic apparatus ED01 may include a plurality of camera modules ED80 having different attributes or functions. In this case, one of the plurality of camera modules ED80 may be a wide-angle camera, and another of the plurality of camera modules ED80 may be a telephoto camera. Similarly, one of the plurality of camera modules ED80 may be a front camera, and another of the plurality of camera modules ED80 may be a rear camera.

FIGS. 11 to 21 are views illustrating various examples of an electronic apparatus including the image acquisition apparatus 1000 according to example embodiments.

Figure 12:
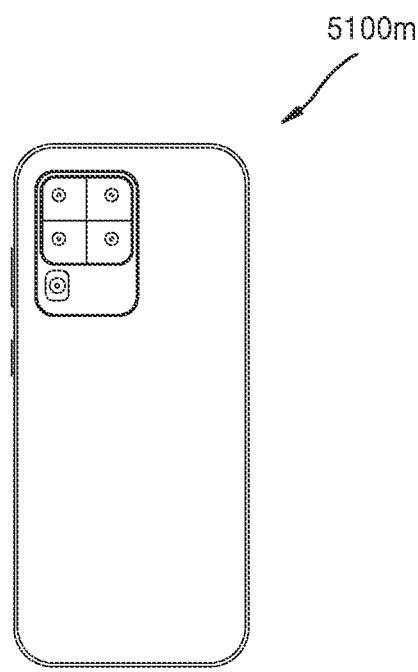
FIGS. 12, 13, 14, 15, 16, 17, 18, 19, 20, and 21 are views illustrating various examples of an electronic apparatus including an image acquisition apparatus according to an example embodiment.
Figure 13:
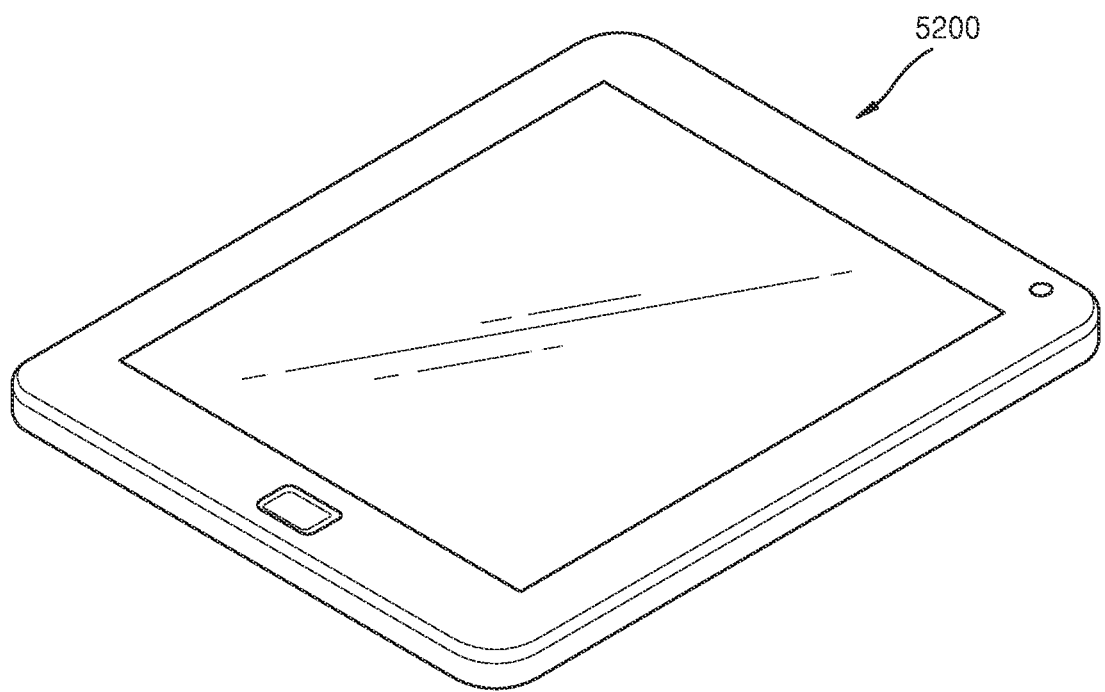
Figure 14:
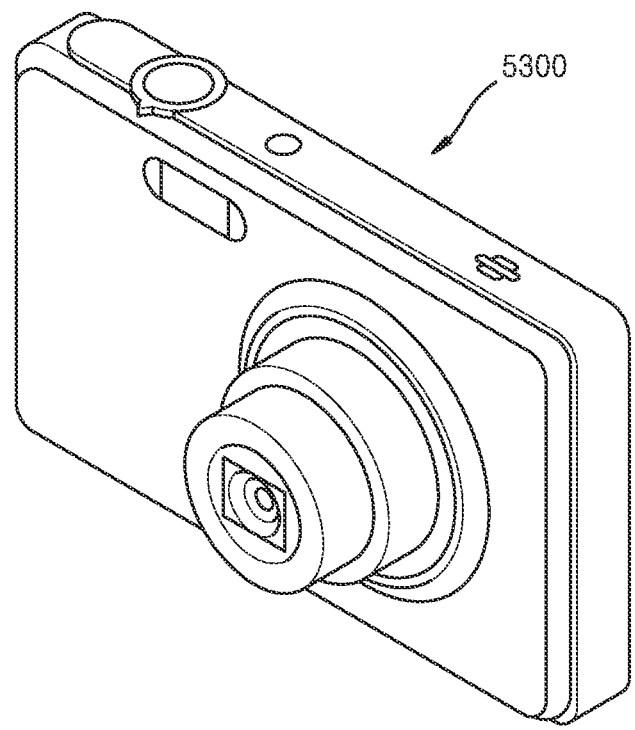
Figure 15:
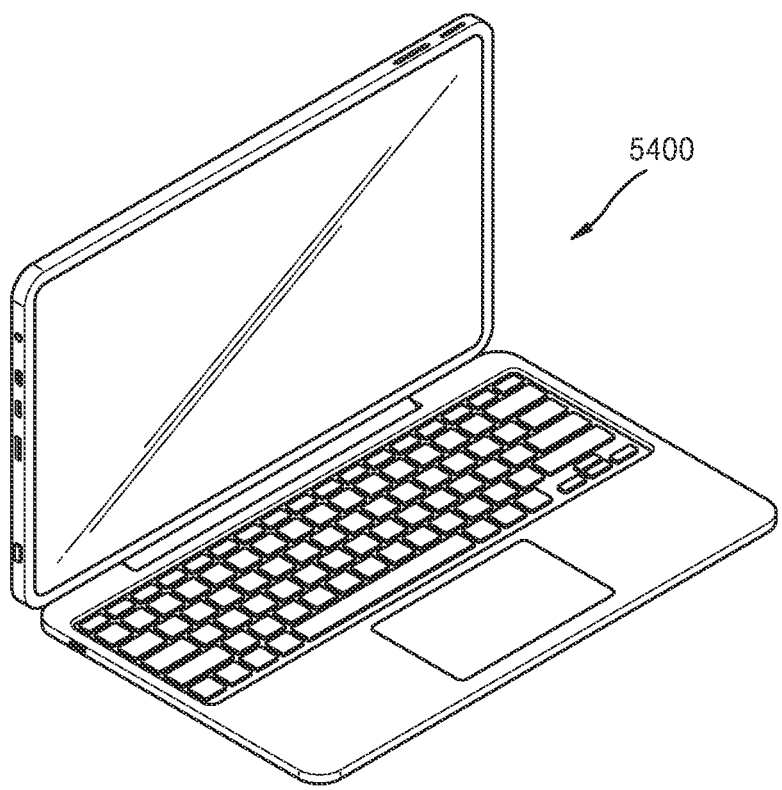
Figure 16:
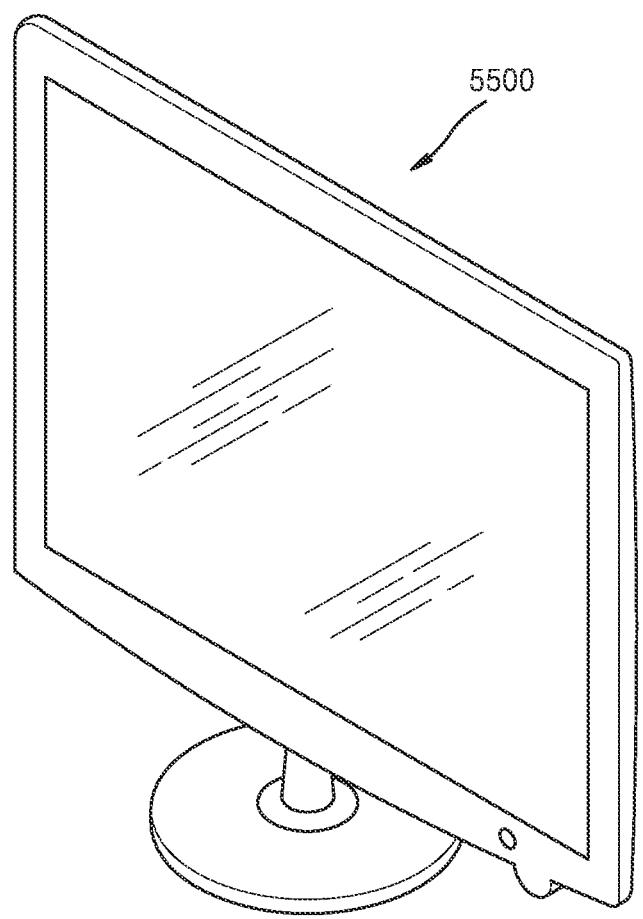
Figure 19:
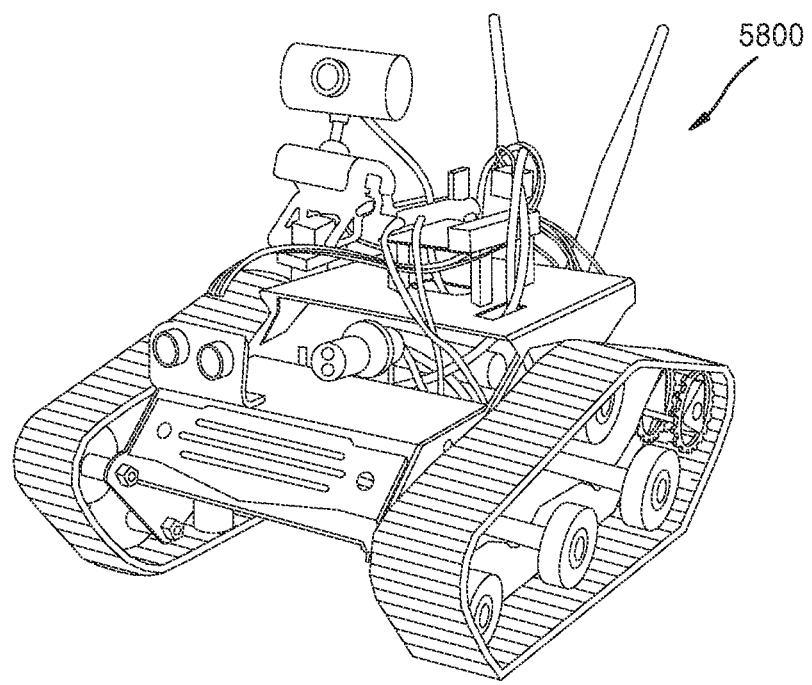

According to example embodiments, the image acquisition apparatus 1000 may be applied to a mobile phone or smartphone 5100m shown in FIG. 12, a tablet or smart tablet 5200 shown in FIG. 13, a digital camera or camcorder 5300 shown in FIG. 14, a laptop computer 5400 shown in FIG. 15, or a television or smart television 5500 shown in FIG. 19. For example, the smartphone 5100m or the smart tablet 5200 may include a plurality of high-resolution cameras each having a high-resolution image sensor mounted thereon. The high-resolution cameras may be used to extract depth information of objects in an image, adjust out of focus of an image, or automatically identify objects in an image.

Figure 17:
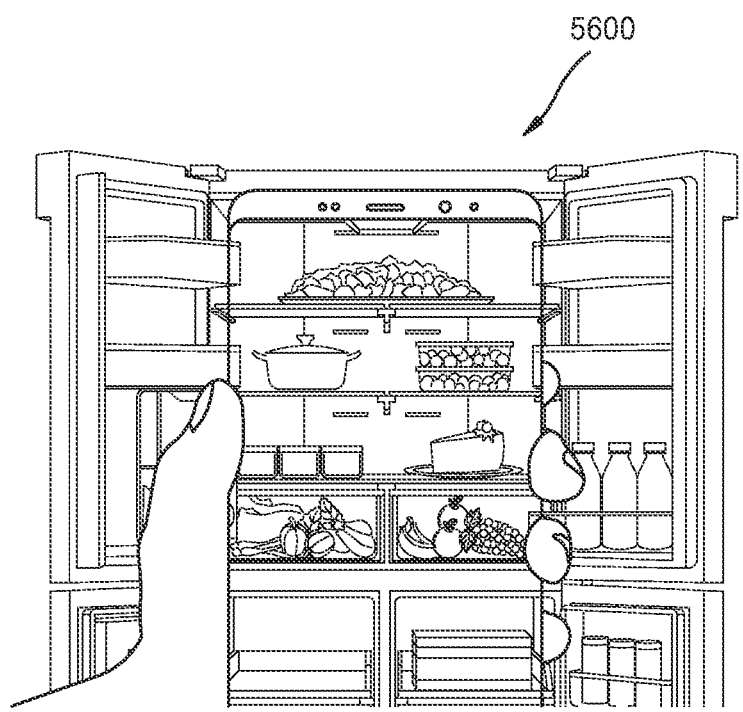
Figure 18:
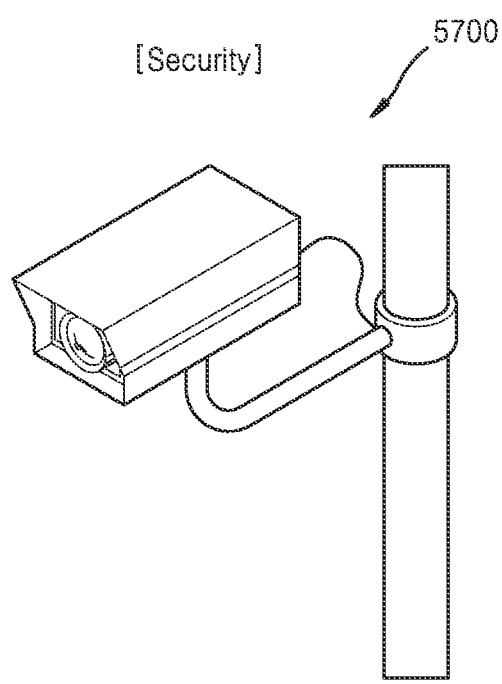
Figure 20:
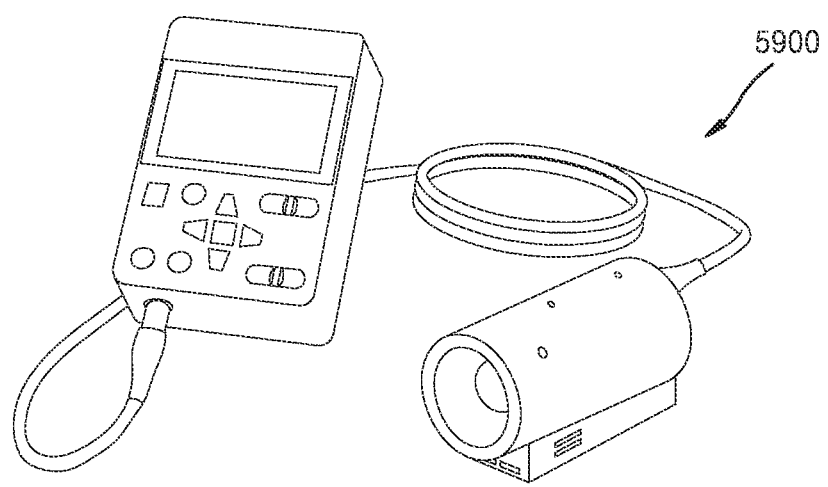

In addition, the image acquisition apparatus 1000 may be applied to a smart refrigerator 5600 shown in FIG. 17, a security camera 5700 shown in FIG. 18, a robot 5800 shown in FIG. 19, a medical camera 5900 shown in FIG. 20, and the like. For example, the smart refrigerator 5600 may automatically recognize food contained in the smart refrigerator 5600 by using the image acquisition apparatus 1000, and may inform a user of whether a specific food is contained in the smart refrigerator 5600, the type of food put into or out of the smart refrigerator 5600, and the like through a smartphone. The security camera 5700 may provide an ultra-high-resolution image and may recognize an object or a person in the ultra-high-resolution image even in a dark environment owing to high sensitivity of the security camera 5700. The robot 5800 may be sent to a disaster or industrial site that cannot be directly accessed by humans and may provide high-resolution images. The medical camera 5900 may provide a high-resolution image for diagnosis or surgery, and may have a dynamically adjustable field of view.

Figure 21:
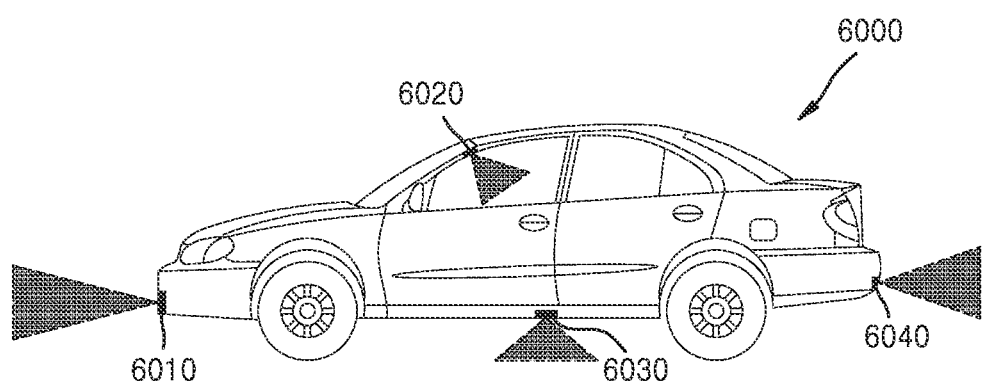

In addition, the image acquisition apparatus 1000 may be applied to a vehicle 6000 as shown in FIG. 21. The vehicle 6000 may include a plurality of vehicle cameras 6010, 6020, 6030, and 6040 arranged at various positions. Each of the vehicle cameras 6010, 6020, 6030, and 6040 may include an image acquisition apparatus according to an embodiment. The vehicle 6000 may use the vehicle cameras 6010, 6020, 6030, and 6040 to provide a driver with various information about the interior or surroundings of the vehicle 6000, and may provide information necessary for autonomous driving by automatically recognizing objects or people in images.

According to an example embodiment, by using photon counting technology, the image sensor may directly perform an operation on pixel values in a pixel without transmitting a pixel value read from the image sensor CM30 to an ISP outside the pixel.

In addition, by performing, in a pixel, a processing operation in which pixel values may be operated, for example, a pixel value operation for 2PDAF, the AF speed may be improved, and power consumption of the image acquisition apparatus may be reduced.

In addition, by including a plurality of sub-pixels, the individual sub-pixels may be selectively driven to obtain a pixel value, and thereby an image having a resolution as large as the number of sub-pixels may be obtained even by using a readout circuit having the same size.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. An image sensor using photon counting, the image sensor comprising a pixel:
 wherein the pixel comprises:
  a plurality of sub-pixels;
  a plurality of counters which are respectively connected to the plurality of sub-pixels and configured to count and output a plurality of pulse signals generated based on photons incident on each of the plurality of sub-pixels; and
  an operator circuit configured to perform an operation on an output value output from each of the plurality of counters; and
 wherein the operator circuit being configured to perform the operation includes being configured to perform addition, subtraction, multiplication, and division.

2. The image sensor of claim 1, wherein each of the plurality of sub-pixels is a single photon avalanche diode (SPAD).

3. The image sensor of claim 1, wherein the plurality of sub-pixels comprise a first sub-pixel and a second sub-pixel.

4. The image sensor of claim 1, wherein the operation is any of an addition, a subtraction, a multiplication, and a division.

5. The image sensor of claim 4, wherein at least one operation from among the addition, the subtraction, the multiplication, and the division is preset.

6. The image sensor of claim 3, wherein the operator circuit is further configured to output a result value obtained by performing a subtraction operation on a first output value output from a first counter connected to the first sub-pixel and a second output value output from a second counter connected to the second sub-pixel.

7. The image sensor of claim 1, wherein sizes of the plurality of sub-pixels are different from each other.

8. An image acquisition apparatus comprising a pixel array comprising a plurality of pixels:
wherein each of the plurality of pixels comprises
a plurality of sub-pixels;
a plurality of counters which are respectively connected to the plurality of sub-pixels and are configured to count and output a plurality of pulse signals generated based on photons incident on each of the plurality of sub-pixels; and
an operator circuit configured to perform an operation on an output value output from each of the plurality of counters;
wherein the operator circuit being configured to perform the operation includes being configured to perform addition, subtraction, multiplication, and division; and
wherein the image acquisition apparatus further comprises a processor configured to process an operation value output from an operator circuit of each of the plurality of pixels.

9. The image acquisition apparatus of claim 8, wherein each of the plurality of sub-pixels is a single photon avalanche diode (SPAD).

10. The image acquisition apparatus of claim 8, wherein the operation is any of an addition, a subtraction, a multiplication, and a division.

11. The image acquisition apparatus of claim 10, wherein the processor is further configured to set any operation from among the addition, the subtraction, the multiplication, and the division.

12. The image acquisition apparatus of claim 8, wherein the plurality of sub-pixels comprise a first sub-pixel and a second sub-pixel.

13. The image acquisition apparatus of claim 12, wherein the operator circuit is further configured to output a result value obtained by performing a subtraction operation on a first output value output from a first counter connected to the first sub-pixel and a second output value output from a second counter connected to the second sub-pixel.

14. The image acquisition apparatus of claim 13, wherein the processor is further configured to perform a phase difference auto focusing (AF) based on a plurality of result values respectively output from operators of the pixel array.

15. The image acquisition apparatus of claim 8, wherein the processor is further configured to output a select signal for each of the plurality of sub-pixels.

16. The image acquisition apparatus of claim 8, wherein a first sub-pixel from among the plurality of sub-pixels is a pixel having a first luminance, and
wherein a second sub-pixel from among the plurality of sub-pixels is a pixel having a second luminance that is higher than the first luminance.

17. The image acquisition apparatus of claim 8, wherein sizes of the plurality of sub-pixels are different from each other.

18. The image acquisition apparatus of claim 8, wherein each of the pixel array and a readout circuit corresponds to an M×N array, and,
when the number of the plurality of sub-pixels is K, a resolution of an image obtained from the pixel array is K×M×N.

19. The image acquisition apparatus of claim 8,
wherein the processor is provided outside of the each of the plurality of pixels.

20. An electronic apparatus comprising an image acquisition apparatus:
wherein the image acquisition apparatus comprises a pixel array comprising a plurality of pixels;
wherein each of the plurality of pixels comprises:
a plurality of sub-pixels;
a plurality of counters which are respectively connected to the plurality of sub-pixels and are configured to count and output a plurality of pulse signals generated based on photons incident on each of the plurality of sub-pixels; and
an operator circuit configured to perform an operation on an output value output from each of the plurality of counters;
wherein the operator circuit being configured to perform the operation includes being configured to perform addition, subtraction, multiplication, and division; and
wherein the image acquisition apparatus further comprises a processor configured to process an operation value output from an operator circuit of each of the plurality of pixels.

* * * * *